United States Patent
Stockman et al.

[11] Patent Number: 5,862,291
[45] Date of Patent: Jan. 19, 1999

[54] CABLE ROUTING DEVICE

[75] Inventors: Anthony J. Stockman; Peter D. Jenkins, both of Woodbridge; Simon C. T. Benton, Felixstowe, all of England

[73] Assignee: Miniflex Limited, Woodbridge, England

[21] Appl. No.: 687,516
[22] PCT Filed: Feb. 7, 1995
[86] PCT No.: PCT/GB95/00244
§ 371 Date: Aug. 6, 1996
§ 102(e) Date: Aug. 6, 1996
[87] PCT Pub. No.: WO95/22071
PCT Pub. Date: Aug. 17, 1995

[30] Foreign Application Priority Data

Feb. 8, 1994 [GB] United Kingdom ............... 9402338
Feb. 8, 1994 [GB] United Kingdom ............... 9402339

[51] Int. Cl.[6] ................................................ G02B 6/00
[52] U.S. Cl. .................................. 385/136; 385/147
[58] Field of Search .................................. 385/136, 135, 385/147

[56] References Cited

U.S. PATENT DOCUMENTS 4,167,303  9/1979  Bowen et al. ............... 385/100

FOREIGN PATENT DOCUMENTS

A0061 243  9/1982  European Pat. Off. .
A0147162  7/1985  European Pat. Off. .
WO 9112548  8/1991  WIPO .

*Primary Examiner*—Akm E. Ullah
*Attorney, Agent, or Firm*—Woodbridge & Associates

[57] ABSTRACT

A cable routing has a body (10) and a plurality of cable passages (22) through the body. Each passage has an entry socket (24) adapted to receive a cable end (20), an exit (26) in line with the entry socket and a lateral opening (28). Each passage also has a cross-sectional reduction between the entry socket (24) and the exit (26) to limit longitudinal movement of a cable (20) along the passage.

15 Claims, 4 Drawing Sheets

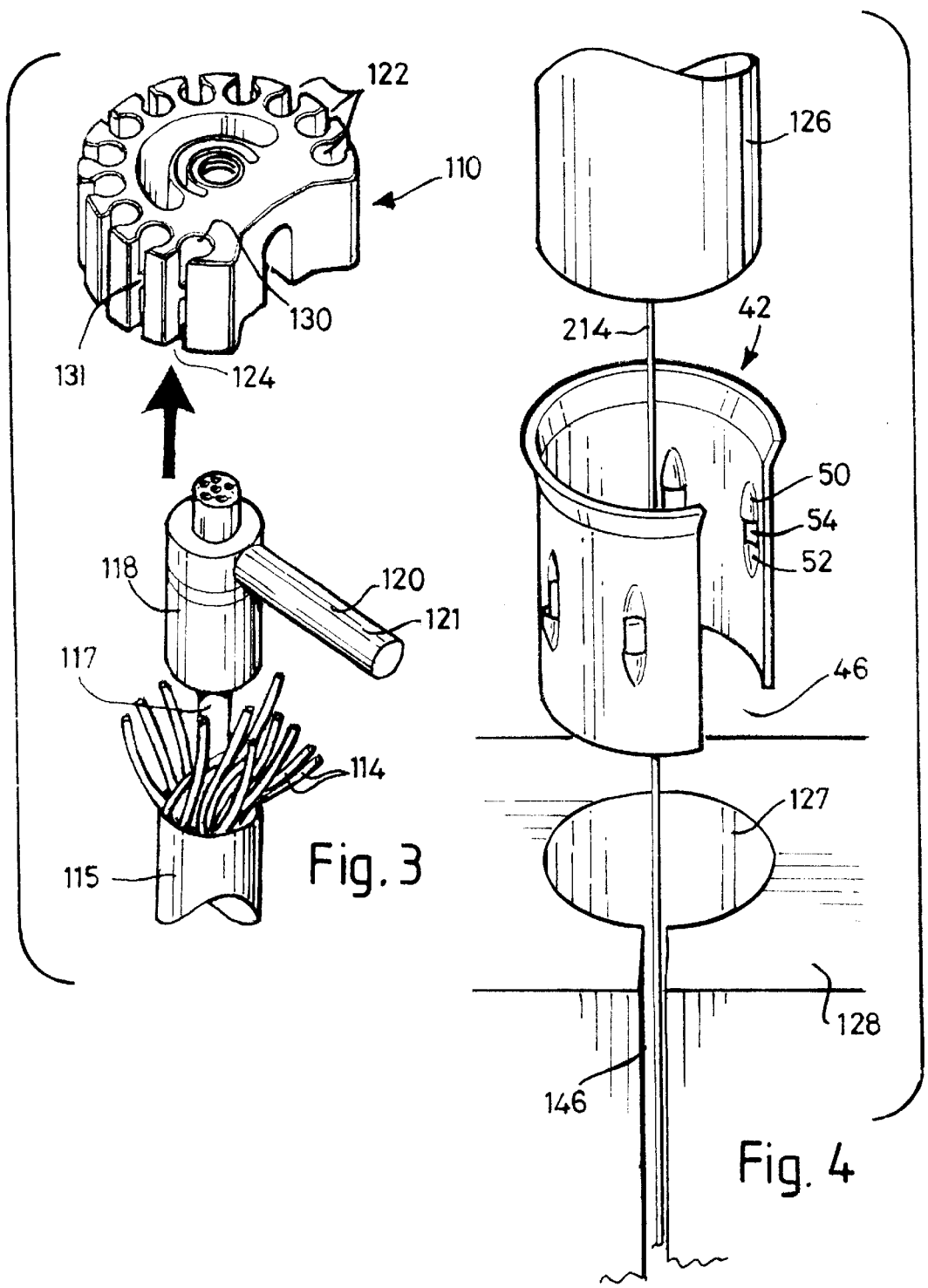

CABLE ROUTING DEVICE

BACKGROUND OF THE INVENTION

This invention relates to a cable routing device, particularly intended for routing optical fibre cables within optical fibre installations, and to a tube retaining clip for use with such routing devices.

Optical fibres are becoming evermore widely used. Where a large number of fibres need to be connected to individual terminal fittings, there is a need for a fibre management system which will ensure that the fibres are correctly handled, not unduly stressed and not damaged, and which also enables the individual fibres to be properly organised so that they can be positioned and routed correctly and can be identified.

Optical fibres are conventionally guided within a protective sheath or outer cable which provides physical protection for the fibre. However where the fibre has to be terminated and/or connected to other fibres, the fibre has to emerge from the outer cable, and at this point care is needed to ensure that the fibre is not mis-handled.

SUMMARY OF THE INVENTION

According to the present invention there is provided a cable routing device comprising a body, a plurality of cable passages through the body, each passage having an entry socket adapted to receive a cable end, an exit in line with the entry socket and a lateral opening, and each passage further having a cross-sectional reduction between the entry end and the exit to limit longitudinal movement of a cable along the passage.

In this specification, the terms 'entry' and 'exit' merely denote opposing physical ends of a passage; they do not imply or signify any particular use or any particular direction of flow through the passage.

The body is preferably a plastics moulding, and the passages may be cylindrical. The exit end of each passage may be of smaller diameter than the entry socket, or alternatively the exit end may be formed with an exit socket of similar diameter to the entry socket.

Where the exit end does not have a socket, but merely provides a passage in which a fibre can be directly accommodated, the exit end may have a flared bell-mouth end to ensure that exiting fibres are not bent more sharply than a predetermined radius.

The width of the lateral opening is smaller than the diameter of the entry socket, and the width of the opening is preferably from 2 to 4 mm, most preferably from 2.5 to 3.5 mm. The diameter of the entry socket (and of the exit socket if present) is preferably at least 4.5 mm.

The plurality of passages may be arranged in a linear array, in an arcuate array or in any other arrangement.

It is an important feature of the invention that fibre is housed within outer sheathing which is always anchored to fixed structures at either side of any position where fibre leaves an outer sheathing or is not directly protected by an outer sheathing.

The device can be used in combination with a cable retaining clip adapted to retain a cable in the entry and/or exit socket, the clip comprising a tubular body with a discontinuous circumference, inwardly projecting tangs extending from the walls of the tubular body into the cylindrical space bounded by the tubular body, and outwardly projecting tangs extending outwardly from the walls of the body, the inwardly projecting tangs being adapted to engage external walls of a cable and the outwardly projecting tangs being adapted to engage the internal walls of the socket.

The tubular body is preferably constructed from sheet metal, for example stainless steel.

The tangs are present to prevent unintended withdrawal either of a cable end from the clip or of the clip from the socket. Thus the tangs are constructed to allow the components to be pushed together, but to hinder withdrawal of the cable from the socket. The tangs may be barbs with sharp edges which bite into the material of the cable and/or of the socket, or they may be shaped, moulded formations formed to engage with parts of the cable and/or socket.

The tubular body is circumferentially discontinuous so that it can be fitted from one side onto a cable from which a fibre extends, without having to thread the fibre through the body.

Where the clip is of metal, an inwardly and an outwardly projecting tang can be formed in one operation by making a hole in the wall of the clip and distorting opposite ends of the hole in different directions to form tangs.

The ends of the tubular body may be flared outwardly at one end to assist entry of a cable into the body, and/or inwardly at the other end to assist entry of the clip into the socket.

The invention will now be further described, by way of example, with reference to the accompanying drawings, in which:

BRIEF DESCRIPTION OF THE DRAWINGS

FIG. 3 is a perspective view of a second embodiment of routing device in accordance with the invention;

FIG. 4 is an exploded view of part of a routing device showing a retaining clip in use;

DETAILED DESCRIPTION OF THE INVENTION

Figure 1:
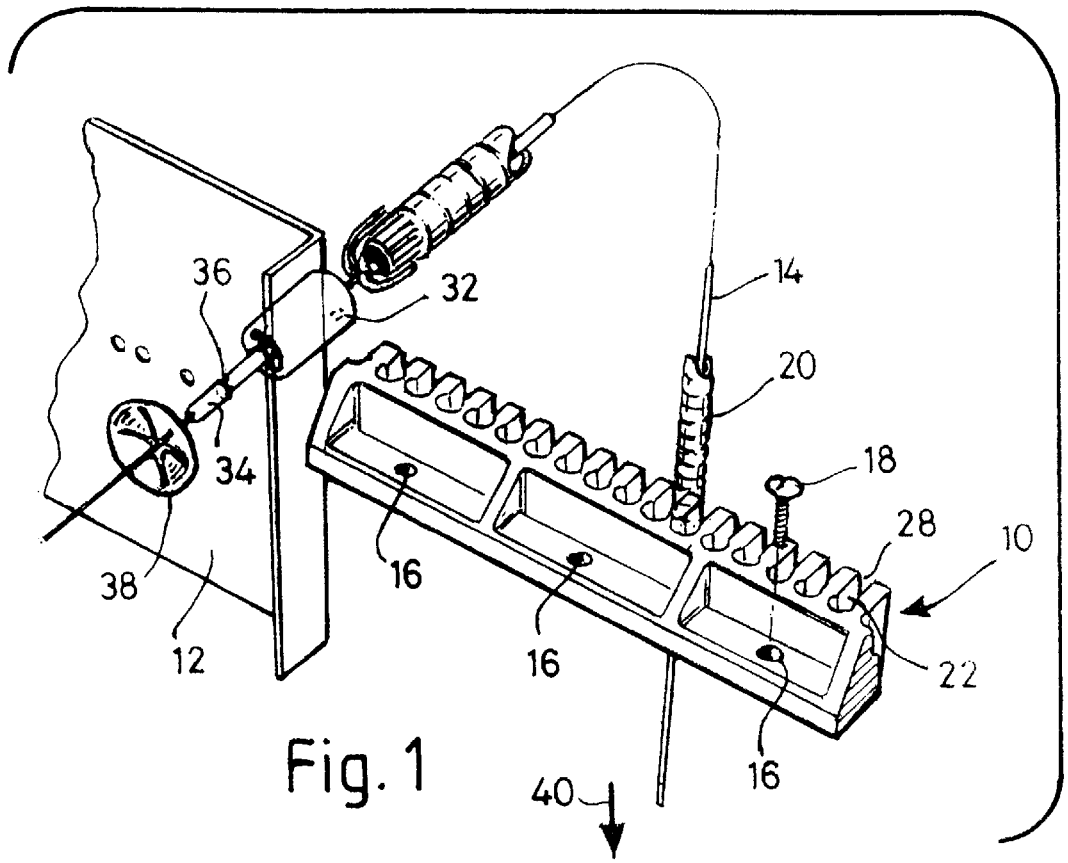
FIG. 1 is a perspective view of a first routing device in accordance with the invention.

FIG. 1 shows a routing device 10 adjacent a bulkhead 12 through which an optical fibre cable 14 is to be routed. The routing device 10 has mounting holes 16 through which it can be secured to a fixed structure using screws 18.

The fibre cable 14 is guided within a bend-limiting sheath 20 which may be of the type described in International Patent Application number WO93/09457. The sheath 20 extends from the routing device 10 to the bulkhead 12 and protects the fibre cable 14 in this area where the fibre cable is diverted through a right angle.

Figure 2:
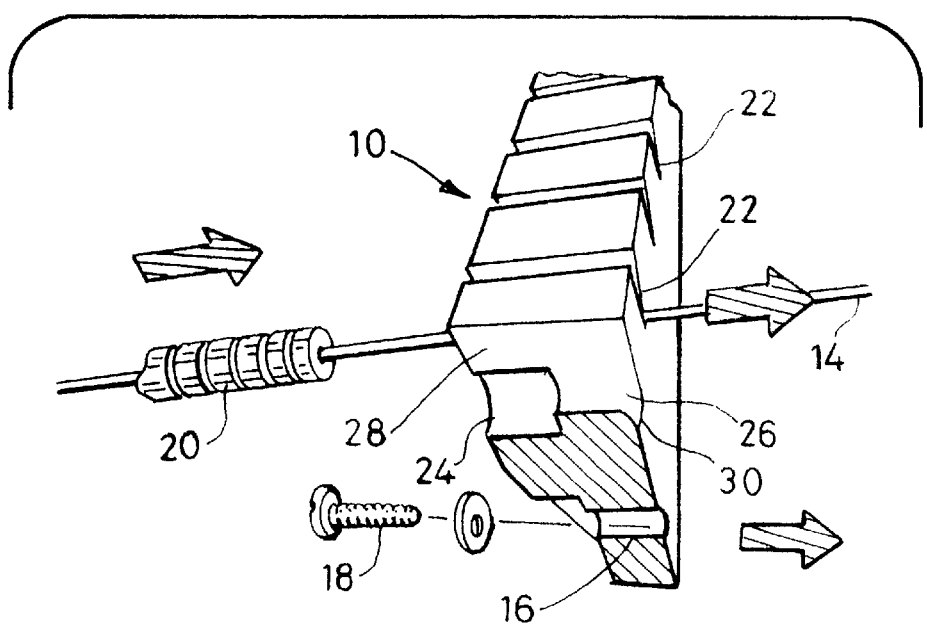
FIG. 2 is another perspective view of the device of FIG. 1, cut in half to show a section.

As can be seen in FIG. 2, the routing device 10 has a number of passages 22 through which fibre cables 14 can pass. Each passage has a large diameter entry socket 24, a small diameter exit end 26 and a lateral opening 28. The diameter of the entry socket 24 is sufficient to receive the end of the sheath 20 and the diameter of the exit end 26 is less than that of the sheath but greater than the diameter of the fibre cable so that the fibre cable can pass through but the sheath is held in the passage. The width of the lateral opening is great enough to allow lateral entry of the fibre cable into the passage. The exit end 26 ends in a bell-mouth 30 (radius for example 30 mm) which allows the fibre cable 14 to exit without passing around any sharp corners.

At its other end, the sheath 20 is fixed in an anti-rotation crimp 32 which also terminates the strength members in the fibre cable. The optical fibre within the fibre cable 14 passes through a ferrule 34 which supports the sheath 20 under the crimp 32 and also extends beyond the end of the sheath 20. The ferrule passes through a hole 36 in the bulkhead 12 and is retained in place by a star washer 38.

Optical fibre cable can withstand reasonable forces applied along its axis, but is susceptible to damage on bending. If a force is applied to the fibre cable 14 in the direction of the arrow 40 in FIG. 1, then the presence of the sheath 20 will restrain the fibre at a controlled bend radius where it is diverted through an angle so that the fibre is not unduly stressed. The tensile load in the fibre cable 14 resulting from the force applied in the direction of the arrow 40 will be transferred from the cable into the sheath 20 at the crimp 32 and the resulting compression load in the sheath 20 will be restrained in the routing device 10. The ends of the sheath will be held, respectively, in the crimp 32 and in the routing device 10 so that those ends do not move.

FIG. 3 shows an alternative cable routing device 110 which is intended for use with a cable 115 which contains a large number of fibres in tubes 114. Upon leaving the cable 115, the fibre tubes 114 are to be individually routed. The cable 115 includes a central strength giving member 117, and a support body 118 is fixed to this strength member. The support body 118 has a lateral arm 121 which can be secured to a fixed structure (not shown). To the top end of the support body 118, a routing body 110 is secured, and this body has a plurality of fibre tube passages 122 arranged around a circumference.

As can be seen in FIG. 3, each fibre tube passage 122 has an entry socket 124 and an exit socket 130, both of the same diameter. Between the entry and exit sockets is a shoulder 131, and the construction of the passages in this way allows the block 110 to be used either way up, and for receiving cable sheaths 20 from one or from both directions.

In the example shown in FIG. 3, there are twelve fibre tubes 114 and twelve passages 122. Each fibre tube 114 can be introduced laterally into one of the passages 122, and each fibre tube can then be protected by a sheath 20, the lower end of which will be received in a respective one of the passages 122.

Because of the laterally open nature of the passages 122, fibre tubes with a sheath or sheaths threaded on to them can be introduced into the passages by sliding the sheath back to expose a region of the tube which can be laterally inserted into the channel, and then sliding the sheath or sheaths back to locate in the entry/exit sockets.

Each passage 22, 122 has an entry socket which will allow a cable sheath to be inserted in an axial direction. Each passage also has a shoulder with a cross-sectional reduction in the form of a shoulder with a hole through it, which limits axial insertion movement of a cable sheath but allows a fibre/cable to pass through. Some or all passages in a particular routing device may have an exit socket, separated from the entry socket by the shoulder, which also allows insertion of a cable sheath in an axial direction. Each passage also has a lateral opening 28, 128 suitably of the same width as the hole in the shoulder. The lateral opening must be wide enough to allow passage of a fibre, a group of fibres or a fibre-containing cable without a sheath, but narrow enough to prevent a sheath from moving radially out of the entry and exit sockets. Thus the width of the lateral opening (which is preferably straight and parallel to the passage 22, 122) and the diameter of the hole in the shoulder may be from 2 to 4 mm, preferably 2.5 to 3.5 mm. The diameter of the entry and exit sockets is preferably at least 4.5 mm, with the upper limit of the diameter range being determined by the external diameter of sheaths to be used. 5 mm diameter is particularly preferred.

Figure 5:
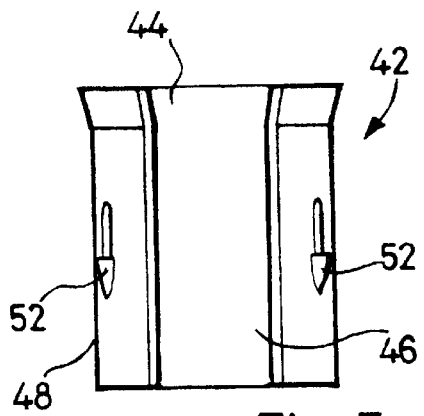
FIG. 5 is a front view of a clip in accordance with the invention.

In order to secure the sheath in the entry/exit sockets of a routing device, a tube retaining clip as shown in FIGS. 4 to 9 can be used. The clip 42 shown on its own in FIG. 5 is made from stainless steel having a thickness of 0.25 mm. The clip has a flared mouth 44, a longitudinal slot 46, a cylindrical body 48 and inwardly and outwardly projecting tangs 50, 52 respectively. Although the drawings show four circumferentially spaced tangs, the clip may be provided with only one inwardly and one outwardly projecting tang, or with a greater number. The use of four tangs 50 and four tangs 52 has been found to be particularly effective.

Figure 6:
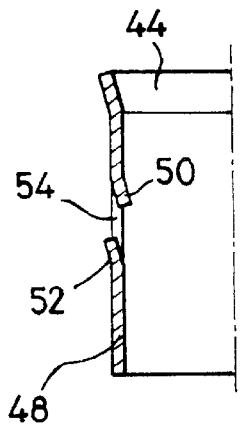
FIG. 6 shows a section through one part of the clip of FIG. 5 taken on the line A—A from FIG. 7.

FIG. 6 shows in more detail how, in one embodiment, the tangs 50, 52 are formed. An opening 54 is made through the wall of the cylindrical body 48. The top end of this opening 54 is then deformed inwards and the bottom end deformed outwards. This can easily be accomplished by placing a rigid rod through the hole 54 in a direction perpendicular to the plane of the opening, and then moving the rod towards the axis of the clip which will result in the top and bottom edges of the opening being distorted to form tangs 50, 52.

Figure 7:
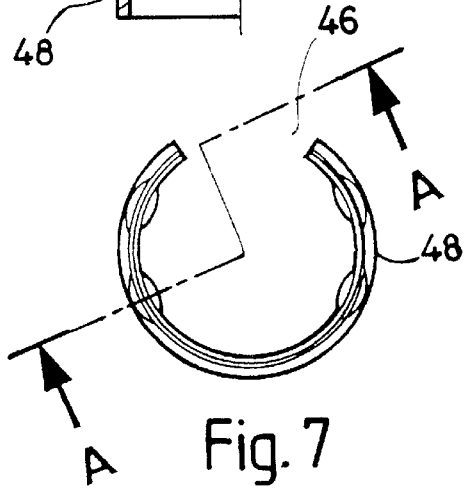
FIG. 7 is a plan view of the clip of FIG. 5.

FIG. 7 is a plan view which shows the cylindrical nature of the body 48 with the longitudinal slot 46 which results in the body 48 having a discontinuous circumference.

Figure 8:
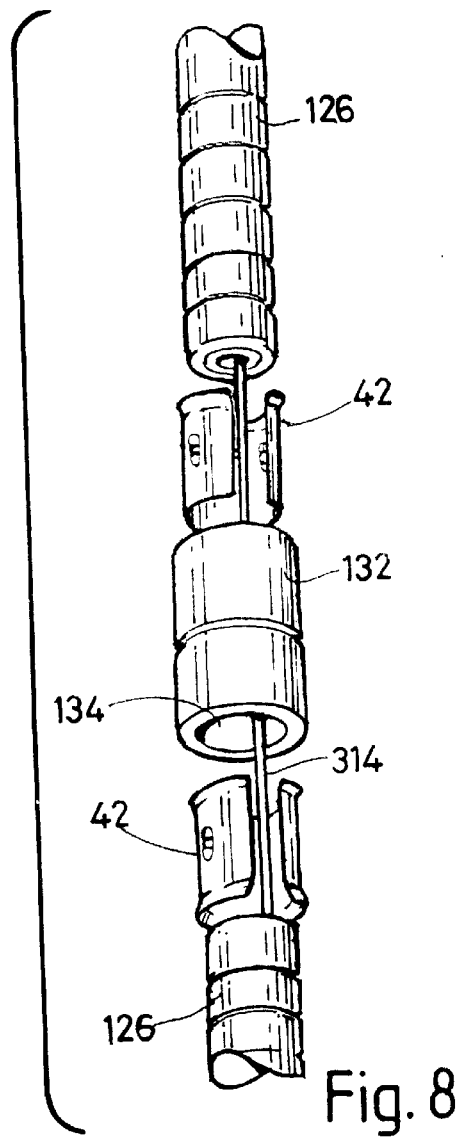
FIG. 8 is a perspective view showing another cable installation.
Figure 9:
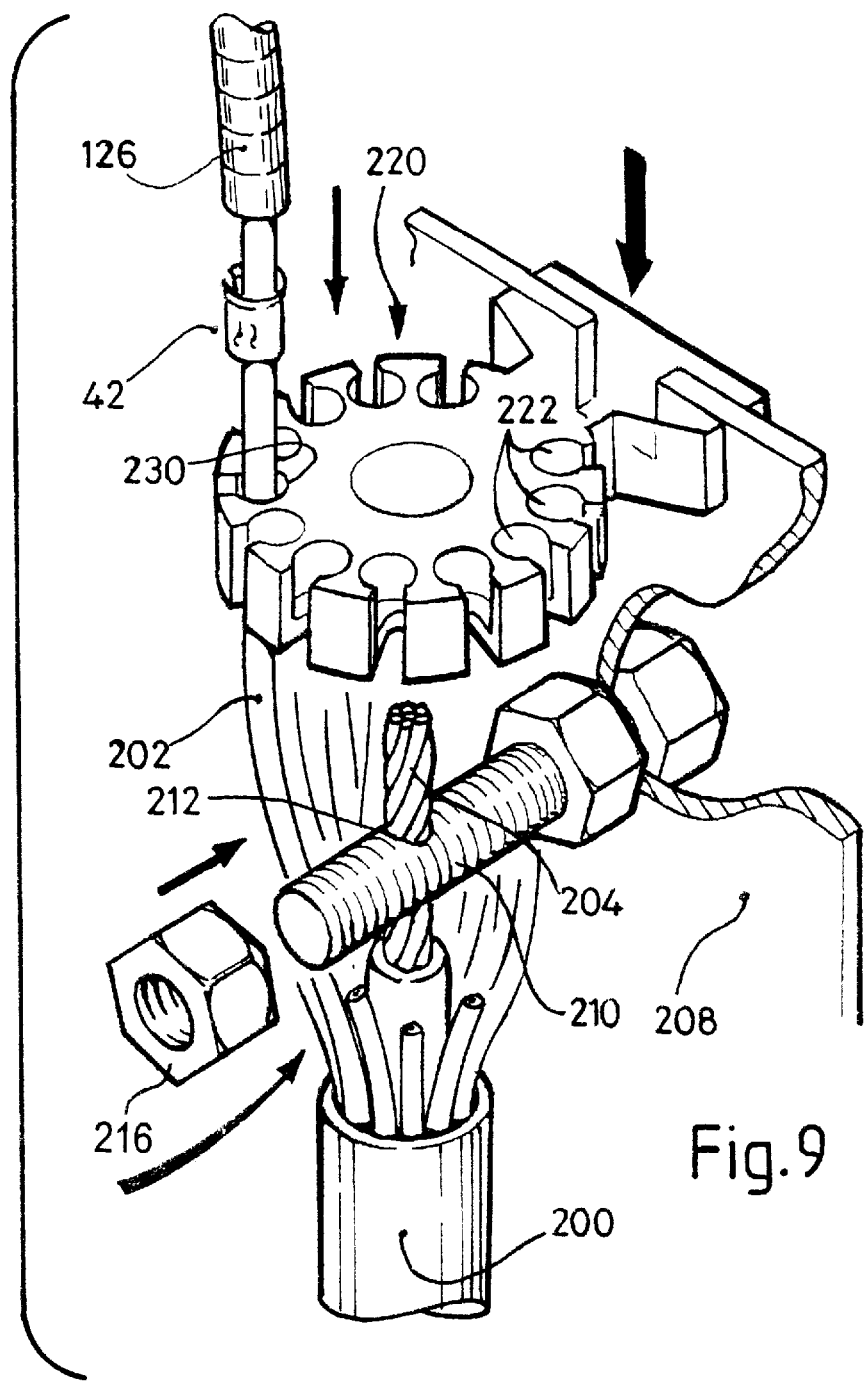
FIG. 9 is a perspective view showing a further cable installation.

The way in which these clips will be used will be apparent from FIGS. 4, 8 and 9.

A continuous optical fibre cable 214 is shown in FIG. 4. At one end the cable 214 passes through a protective outer tube 126, and the tube 126 is to be fitted in a socket 127 in a block 128. To avoid having to find the end of the cable 214 and pass components over the end of the cable with the possible risk of consequential damage, both the clip 42 and the block 128 have longitudinal slots 46, 146. The cable can thus be laid in the clip and in the socket block, as shown in FIG. 4. The clip 42 can then be moved axially over the end of the tube 126 where it will be retained by the internally projecting tangs 50. The end of the tube can then be pressed into the tubular socket 127 in the block 128, where it will be retained by the outwardly projecting tangs 52. The clip and the block may be assembled with the slots 46 and 146 in the clip and the block respectively lining up with one another, but this is not essential. In some applications it may be desirable to fit the clip over the cable 214 and onto the tube 126 before the tube is inserted into the block 128, and in this situation, it does not matter whether or not the slots line up. The cable 214 will be securely held within the passage even if the slots 46, 146 do line up.

In FIG. 8, two clips 42 are used to connect two tubes 126 by way of a connector sleeve 132 which has a socket 134 at each end. It will be seen that the cable 314 is continuous through the whole arrangement, and the tubes 126 can be connected to provide a continuous protection for the cable 314. As previously described with reference to FIG. 4, the clips 42 will be lined up with the tubes 126 and pressed onto the tubes, and the two tubes with the clips attached are then pushed home into the sockets 134 at each end of the sleeve 132.

FIG. 9 shows an arrangement where a fibre cable 200 contains a large number of individual fibres 202 which are to be 'broken out' from the cable 200 and individually routed. The cable 200 contains a central wire strength member 204 which runs the whole length of the cable. Where the cable outer covering 206 is removed, the strength member is exposed and is clamped to a fixed structure 208 by a bolt 210 anchored at one end to the structure 208 and with a hole 212 across a diameter. The strength member is passed through this hole and a nut 216 is then screwed up onto the bolt to grip the wire 204. The cable 200 is thus secured to the structure 208.

Sheaths 126 (only one is shown) are then threaded onto the ends of the fibres 202, and the fibres are located in passages 222 of a routing device 220. The device 220 is also fixedly mounted to the fixed structure 208. Once the fibre 202 has been correctly located, the sheath 126 can be slid down into an entry socket 230, and a clip 42 can be used to secure the sheath in position, as previously described. The fibres 202 are thus relieved from any mechanical stress between the point where they leave the cable 200 and the point where they leave the routing device 220.

Although the clips described are made from sheet stainless steel, they could equally well be made from other materials, for example moulded plastics possibly with integrally moulded metal tangs on the internal and external circumferences. It is however important that the circumferential discontinuity of the clip should enable the clip to be placed around a continuous fibre or cable without having to interrupt the continuity of the fibre or cable.

A purpose-designed tool may be used to insert the clips in a block 128 when the slots 46 and 146 are to be aligned. The tool will be cylindrical with a radially projecting lobe which will be used to align the slots 114 and 146, so that a fibre, fibre cable or fibre tube can be laid in a previously assembled block and clip.

The routing device described here together with the terminal clip of FIGS. 5 to 7 provides a simple and effective way of organising a number of optical fibres which are routed in a relatively small space. It allows fibre or fibre tubes or fibre cables to be laid into the routing device without access to the ends of the fibres, fibre tubes or fibre cables and ensures that the cables are well secured.

We claim:

1. A cable routing device comprising a body, means for securing the body to a fixed structure, a plurality of cable passages through the body, each passage having a cylindrical entry socket adapted to receive a cable end, an exit in line with the entry socket and a lateral opening extending the full length of each passage and having, at least over a part of the opening corresponding to the entry socket, a width less than the diameter of the entry socket, and each passage further having a region between the entry socket and the exit of diameter less than that of the entry socket to limit longitudinal movement of a cable along the passage.

2. A device as claimed in claim 1, wherein the body is a plastics moulding, and the passages are cylindrical.

3. A device as claimed in claim 2, wherein an exit end of each passage is of smaller diameter than the entry socket.

4. A device as claimed in claim 3, wherein the exit end has a flared bell-mouth end to ensure that exiting fibres are not bent more sharply than a predetermined radius.

5. A device as claimed in claim 4, wherein the width of the lateral opening is from 2 to 4 mm.

6. A device as claimed in claim 5, wherein the width of the lateral opening is from 2.5 to 3.5 mm.

7. A device as claimed in claim 6, wherein the diameter of the entry socket is at least 4.5 mm.

8. A device as claimed in claim 7, wherein the plurality of passages are arranged in a linear array.

9. A device as claimed in claim 7, wherein the plurality of passages are arranged in an arcuate array.

10. A device as claimed in claim 2, wherein the exit end is formed with an exit socket of diameter substantially the same as that of the entry socket.

11. A device as claimed in claim 10, wherein the width of the lateral opening is from 2 to 4 mm.

12. A device as claimed in claim 11, wherein the width of the lateral opening is from 2.5 to 3.5 mm.

13. A device as claimed in claim 12, wherein the diameter of the entry socket is at least 4.5 mm.

14. A device as claimed in claim 13, wherein the plurality of passages are arranged in a linear array.

15. A device as claimed in claim 13, wherein the plurality of passages are arranged in an arcuate array.

* * * * *